Patented Jan. 29, 1946

2,393,802

UNITED STATES PATENT OFFICE 2,393,802

CELLULOSE ORGANIC ACID ESTER PLASTICS CONTAINING NN'-DIPHENYL ACETAMIDINE

Donald R. Morey, Rochester, N. Y., and Robert L. Tichenor, Oak Ridge, Tenn., assignors to Eastman Kodak Company, Rochester, N. Y., a corporation of New Jersey No Drawing. Application March 9, 1945, Serial No. 581,935

3 Claims. (Cl. 106—186)

This invention relates to cellulose organic acid ester plastics, and more particularly to the stabilization of such plastics.

As is well known in the art, plastics having excellent properties for a great many purposes can be prepared from cellulose organic acid esters, such, for example, as cellulose acetate, cellulose propionate, cellulose butyrate, cellulose acetate-propionate and cellulose acetate-butyrate, with suitable plasticizers. Many examples of suitable plasticizers are shown in the art. The choice of plasticizers forms no part of our invention.

However, cellulose organic acid ester plastics have not been entirely suitable for use in places where they are exposed to a considerable amount of ultra-violet light: e. g., out of doors. After one or two months of outdoor exposure in a sunny climate, the plastic bleached and became increasingly brittle until, at the end of from three to six months, depending on the severity of the climate, crazing occurred. The rapid deterioration of appearance was accomplished by an equally rapid breakdown in physical properties, such as strength.

Some compounds whose addition to the plastic composition inhibited physical breakdown of the plastic, caused intense discoloration when the plastic was exposed for any length of time to sunlight or other source of ultra-violet light.

We have found that the addition of a small proportion of NN'-diphenyl acetamidine

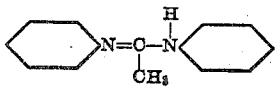

to a cellulose organic acid ester plastic composition strongly inhibits breakdown of the resulting plastic by exposure to ultra-violet light. We prefer to use approximately 1% of NN'-diphenyl acetamidine, based on the weight of cellulose organic acid ester, but we may use somewhat less than 1% or as high as 2% or even somewhat more. As cellulose organic acid esters, we have employed those mentioned above, in which the acyl groups contain from 2 to 4 carbon atoms.

In testing our cellulose organic acid ester plastics containing NN'-diphenyl acetamidine, we have employed outdoor exposure in Arizona, Florida and Tennessee, as well as an accelerated weathering test in the Kline sunlight-fog chamber. This test is described in section B-14 of the Federal Specification for Plastics, Organic; General Specifications (Methods of Tests) L-P-406 or L-P-406a, published by the U. S. Treasury Department, Federal Specifications Division. Two hundred hours under this test has been found to be roughly equivalent to one year of weathering in Washington, D. C. However, the climates of Florida and Arizona are much more severe as to ultra-violet light than the climate of Washington, D. C. In the Kline accelerated test, when samples 0.050"-0.075" thick are used, the bleaching-brittleness stage of a plasticized cellulose organic acid ester plastic containing no ultra-violet inhibitor is reached in about 180–200 hours. Crazing occurs in 200–250 hours exposure, although occasionally 300 hours is reached without crazing, but with the development of brittleness. Similar samples of plasticized cellulose organic acid ester plastics of the same compositions, but containing in addition 1% (based on the weight of cellulose ester) of NN'-diphenyl acetamidine, withstood more than 1200 hours in the Kline accelerated test before failing. Correspondingly favorable results are indicated by the progress of outdoor exposure tests.

NN'-diphenyl acetamidine is advantageously introduced into a cellulose organic acid ester plastic at the time the cellulose ester is compounded with the plasticizer. This compounding may be accomplished by any of the known methods. However, we prefer not to employ the hot-rolling method of compounding in this case, as the plastic may darken on exposure if the hot-rolling method is used when the composition contains NN'-diphenyl acetamidine. When other methods of compounding are used, no substantial discoloration takes place during either outdoor exposure or accelerated testing.

By way of illustration, we give the following examples of making up cellulose organic acid ester plastics containing NN'-diphenyl acetamidine. It will be understood that these illustrations do not constitute a limitation of our invention, which is defined in the appended claims.

*Example 1.*—480 g. of cellulose acetate-butyrate containing approximately 12½% acetyl and 37% butyryl, 40 g. of triphenyl phosphate, and 9.6 g. of NN'-diphenyl acetamidine are dissolved in a mixture of 1640 cc. of ethylene dichloride and 288 cc. of methanol. A sheet is formed from the resulting dope by spreading it on a smooth surface and allowing the solvent to evaporate.

*Example 2.*—Cellulose acetate is substituted for the cellulose acetate-butyrate of Example 1.

Any of the known plasticizers for cellulose organic acid esters, such, for example, as dibutyl phthalate, dibutyl sebacate, methoxy-ethyl stearate, tricresyl phosphate, butoxy-ethyl phthalate, diamyl phthalate, ethyl p-toluene sulfonamide, etc. may be used. In the case of the softer cellulose esters, such as cellulose acetate-butyrate, plastics may even be formed without the use of any plasticizer.

What we claim as our invention and desire to be secured by Letters Patent of the United States is:

1. A cellulose organic acid ester plastic comprising a cellulose organic acid ester whose acyl groups contain from 2 to 4 carbon atoms, a plasticizer therefor, and, as an agent for inhibiting deterioration of the plastic by ultra-violet light, approximately 1% to 2%, based on the weight of the cellulose ester, of NN'-diphenyl acetamidine.

2. A cellulose acetate-butyrate plastic comprising cellulose acetate-butyrate, a plasticizer therefor, and, as an agent for inhibiting deterioration of the plastic by ultra-violet light, approximately 1% to 2%, based on the weight of the cellulose acetate-butyrate, of NN'-diphenyl acetamidine.

3. A cellulose acetate-butyrate plastic comprising cellulose acetate-butyrate and, as an agent for inhibiting deterioration of the plastic by ultra-violet light, approximately 1% to 2%, based on the weight of the cellulose acetate-butyrate, of NN'-diphenyl acetamidine.

DONALD R. MOREY.
ROBERT L. TICHENOR.

---

CERTIFICATE OF CORRECTION.

Patent No. 2,393,802.   January 29, 1946.

DONALD R. MOREY, ET AL.

It is hereby certified that error appears in the printed specification of the above numbered patent requiring correction as follows: Page 1, first column, line 22, for "accomplished" read --accompanied--; and that the said Letters Patent should be read with this correction therein that the same may conform to the record of the case in the Patent Office.

Signed and sealed this 16th day of April, A. D. 1946.

Leslie Frazer
First Assistant Commissioner of Patents.

(Seal)